United States Patent Office 2,917,922
Patented Dec. 22, 1959

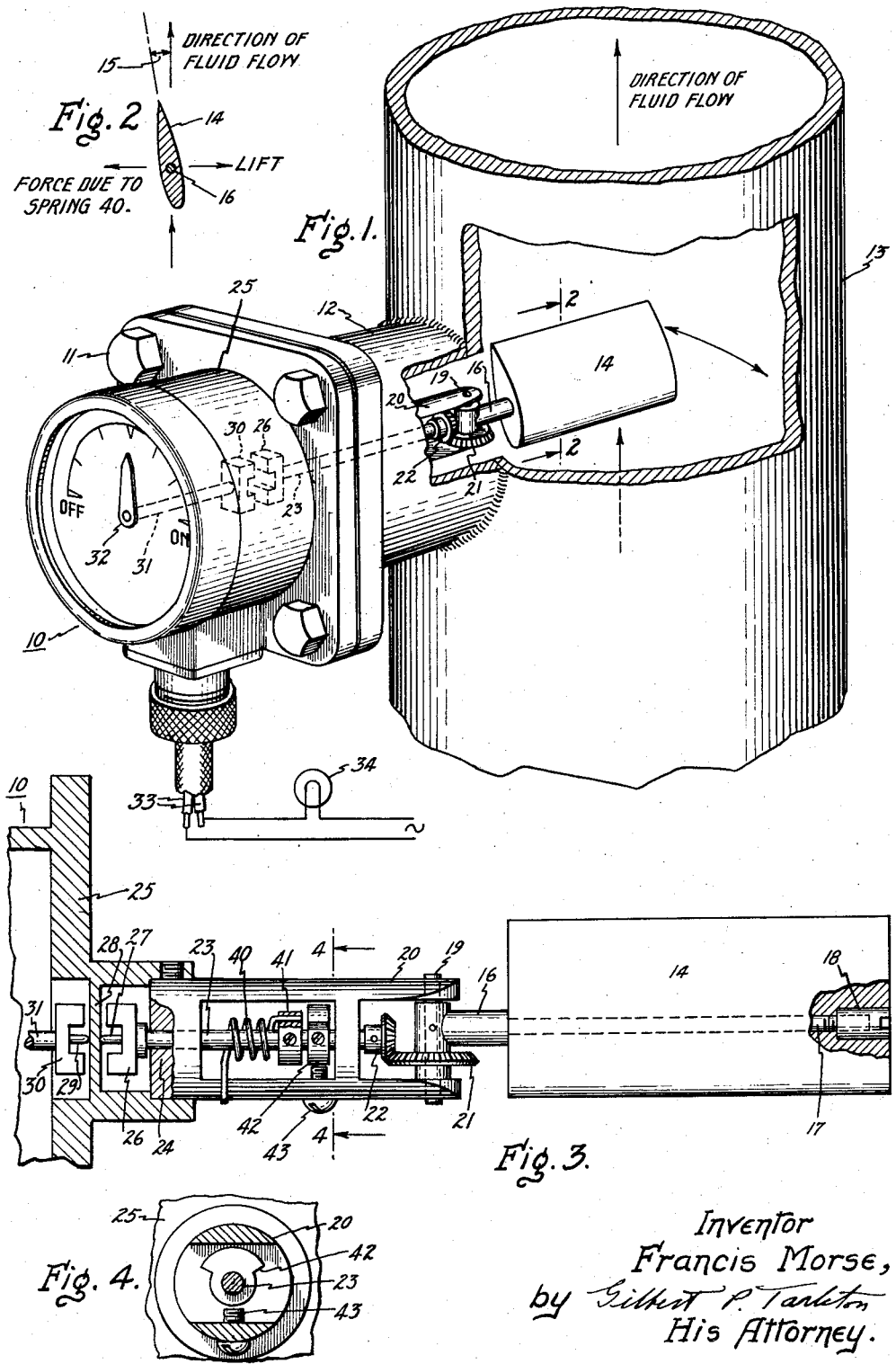

2,917,922
FLOW INDICATOR

Francis Morse, Pittsfield, Mass., assignor to General Electric Company, a corporation of New York Application February 16, 1955, Serial No. 488,608

5 Claims. (Cl. 73—228)

This invention relates to the measurement of fluid flow, and more in particular to an improved flow indicator for indicating the rate of flow of a fluid, for example, the oil circulating in the cooling system of a transformer. From the following disclosure, however, it will be obvious that the invention is not limited to this application and the fluid may be a gas instead of a liquid.

In a power transformer it is common to use oil as a dielectric material as well as a coolant. The circulation system for the oil is generally external to the transformer tank, and coolant pumps are frequently employed to force the oil at the desired rate of flow through the system in order to maintain the temperature of the transformer within safe operating limits. In this type of system it is desirable to provide means for indicating the rate of flow of the oil in order to readily determine if the coolant pump is functioning properly, since great damage may occur if the transformer is overheated. It is also desirable that the indicating means be provided with an alarm indicator to give a visual or audible alarm when the rate of flow of oil falls below a predetermined minimum or ceases entirely.

There are several features that are desirable in this type of flow indicator. The indicator should be capable of measuring very high rates of flow through circulation systems having very large cross sectional area without introducing any appreciable resistance to the rate of flow. It is also preferred that the indicator introduce a minimum of turbulence in the circulation system. The indicator should also have as simple a construction as possible to reduce danger of failure as well as to minimize the cost.

It is therefore an object of this invention to provide an improved device for indicating the rate of flow of fluids.

Another object is to provide a flow indicator capable of measuring very high rates of fluid flow without introducing appreciable resistance to the rate of flow and without creating appreciable turbulence in the fluid.

A further object of this invention is to provide a fluid flow indicator employing airfoil section means positioned in the path of a moving fluid for providing a mechanical displacement proportional to the rate of flow of the fluid.

Briefly stated, in a preferred embodiment of this invention, a cylinder having an airfoil shaped cross section is positioned in the path of a moving fluid with its axis normal to the direction of fluid flow and its chord set at a slight angle of incidence to the direction of fluid flow. The cylinder is pivoted for movement in a plane normal to the direction of fluid flow about a point external to the cylinder. Force on the airfoil due to the flow of fluid acts against spring means to angularly displace the cylinder about the above-mentioned point. This angular displacement is then transmitted to an indicating device for indicating the displacement of the cylinder and therefore the rate of flow of the fluid.

My invention will be better understood from the following description taken in connection with the accompanying drawing and its scope will be pointed out in the appended claims.

In the drawing:

Fig. 1 is a perspective partially cross-sectional view of one embodiment of the flow indicator of this invention, Fig. 2 is a cross sectional view of the airfoil of the flow indicator illustrated in Fig. 1 taken along the lines 2—2, Fig. 3 is a partially cross-sectional side view of the flow indicator of Fig. 1, and Fig. 4 is a cross-sectional view of the flow indicator of Fig. 3 taken along the lines 4—4.

Referring now to Fig. 1, therein is illustrated a flow indicator 10 rigidly affixed by means of bolts 11 to a flanged side extension 12 of a pipe 13. The pipe 13 may be located in the circulation system of a dielectric fluid insulated transformer. The flow meter is comprised of a cylinder 14 having an airfoil shaped cross section (as shown in Fig. 2), hereinafter referred to as the airfoil section. The axis of the airfoil section 14 is normal to the direction of fluid flow in pipe 13 as indicated by the arrows. The chord of the airfoil section is disposed at a slight angle of incidence 15 to the direction of fluid flow (as seen in Fig. 2).

A first shaft 16 is rigidly fastened to the airfoil section 14, and extends therefrom substantially parallel to the axis of the airfoil section. A typical means for holding the airfoil section on the shaft 16 is illustrated in Fig. 3, wherein the shaft 16 is shown having a small diameter threaded end 17 extending through the airfoil section and a larger diameter section extending from the airfoil section. A nut 18 threaded on the end 17 of the shaft forces the airfoil section against the larger diameter section of the shaft in order to prevent rotation of the airfoil section about the shaft but permitting desired fixed angular displacements to be made. The other end of shaft 16 is fixed to a pin 19 which is rotatably held in a frame member 20. A first bevel gear 21 is rigidly attached to the pin 19, and is in mating contact with a second bevel gear 22.

The second bevel gear 22 is rigidly affixed to a second shaft 23 which rotates in a bearing 24 in the end of the frame 20. If desired other bearings may be provided on the shaft 23 in order to properly hold the second bevel gear 22 in mating relationship with the first bevel gear 21.

The frame 20 is rigidly held in an indicator body 25 by means of a set screw. A magnet 26 is affixed to the end of shaft 23, and a pin 27 also affixed to the end of shaft 23 holds the magnet a fixed distance from a thin wall 28 in the meter body 25. A similar pin 29 holds a second magnet 30 a fixed distance away from the other side of thin wall 28, and the second magnet is attached to a shaft 31 which drives an indicating pointer 32 (Fig. 1) of the flow indicator 10. The shaft 31 may also be connected by means (not illustrated) to actuate a switch (also not illustrated) internally connected to leads 33. A visible indicator such as a light 34 or an audible indicator may be connected to the leads 33.

Referring now to Figs. 3 and 4, a torsion spring 40 has one end attached to shaft 23 by means of an adjustable stop 41 for adjusting the torque of the spring. The other end of the spring extends through the side of the frame 20 and is thereby prevented from rotating with the shaft 23. Another adjustable stop 42 coacts with a set screw 43 to provide end limits of rotation for the shaft 23.

Since the airfoil section 14 is pivoted for rotation about the pin 19, the airfoil section is free to move only in a plane normal to the direction of fluid flow and substantially normal to the longitudinal axis of the airfoil section, and the angle of incidence 15 between the airfoil chord and the direction of fluid flow remains constant. When no fluid is flowing in the pipe 13, the torsion spring 40, by means of the shaft 23 and bevel gears 21 and 22, holds the airfoil section at a predetermined position in the pipe. When the fluid in the pipe flows past the airfoil section, for example in an upward direction as indicated in Fig. 1, a force is exerted on the airfoil section that is normal to the direction of flow and tends to rotate the airfoil section about the pin 19 against the force of the spring 40. This results in an angular displacement of the airfoil section that is proportional to the "lift" or force on the airfoil due to the flow of fluid. Since it may be shown that the "lifting force" acting on an airfoil is proportional to the square of the flow velocity of fluid in which the airfoil is placed, the angular displacement of the airfoil section about the pin 19 is proportional to the square of the velocity of fluid in the pipe 13. Referring to Fig. 2, when the fluid is moving upward past the airfoil section as indicated, the force or "lift" acting on the airfoil section is directed toward the right, and the force acting on the airfoil section due to the spring 40 is directed toward the left. The angle of incidence 15 should be selected to give the desired lifting force without creating turbulence in the fluid. In other words, the angle 15 should be less than the critical "stall angle" well known in aerodynamic theory. Since the critical stall angle is dependent upon the cross section of the airfoil the optimum angle of incidence 15 also varies with the airfoil cross section. Other variables such as viscosity and fluid density do not greatly affect the stall angle within the limits normally encountered in the application of the present device. The optimum angle may be readily determined, however, for any set of operating conditions.

The angular displacement of the airfoil section 14 due to the flow of fluid is transmitted to the bevel gear 21 by shaft 16, and thus to shaft 23 and magnet 26 by means of bevel gear 22. The movement of magnet 26 is followed by magnet 30 on the opposite side of the thin wall 28, and thus an angular displacement occurs on the shaft 31 connected to magnet 30 that is proportional to the displacement of the airfoil section. This method of transmitting the angular displacement of the airfoil section through a thin wall serves to prevent escape of the fluid through the meter. However, any other suitable means for accomplishing this function may be employed without departing from the scope of this invention.

The angular displacement of the shaft 31 is indicated by pointer 32. As previously stated, the shaft 31 may also actuate an alarm switch connected to the leads 33 thereby causing alarm light 34 or any other suitable visual or audible device to be actuated at any desired shaft displacement. This feature is of particular importance in the case of dielectric fluid insulated transformers, wherein the cessation of fluid flow in the circulation system may cause serious damage to the transformer. In this case it is desirable that an alarm be given when the rate of fluid flow in the circulation system falls below a predetermined value. In other application, however, it may be desirable that an alarm be given when the fluid flow exceeds a predetermined value.

From the foregoing description it is obvious that other modifications may be made wherein movement of an airfoil section normal to the direction of fluid flow and substantially normal to the axis of the airfoil section may be used to indicate a rate of fluid flow.

It will be understood, of course, that while the form of the invention herein shown and described constitutes a preferred embodiment of the invention, it is not intended herein to illustrate all of the possible equivalent forms or ramifications of the invention. It will also be understood that the words used are words of description rather than of limitation and that various changes may be made without departing from the spirit or scope of the invention herein disclosed.

What I claim as new and desire to secure by Letters Patent of the United States is:

1. Means for indicating the rate of flow of fluid in a pipe comprising shaft means extending into said pipe, one end of said shaft means being pivoted adjacent the wall of said pipe about an axis parallel to the axis of said pipe, an airfoil section disposed centrally within said pipe and rigidly affixed on the other end of said shaft means, the axis of said airfoil section being normal to the axis of said pipe, the chord of said airfoil section having an angle of less than the critical stall angle with respect to fluid flow in said pipe parallel to the axis of said pipe, indicated means disposed externally of said pipe, means transmitting pivotal movement of said shaft means to said indicating means, and means resiliently holding said shaft means at a predetermined angular position in said pipe.

2. Means for indicating the rate of flow of fluid in a pipe comprising first shaft means extending into said pipe normal to the axis of said pipe, one end of said first shaft means being pivoted adjacent the wall of said pipe about an axis parallel to the axis of said pipe, an airfoil section disposed centrally within said pipe and rigidly affixed on the other end of said first shaft means, the axis of said airfoil section being normal to the axis of said pipe, the chord of said airfoil section having an angle of less than the critical stall angle with respect to fluid flow in said pipe parallel to the axis of said pipe, pipe extension means extending normal to said pipe, second shaft means extending axially through said extension means, bevel gear means translating pivotal movement of said first shaft means to rotational movement of said second shaft means, spring means resiliently holding said first shaft means at a predetermined angular position in said pipe, and external indicating means on said extension means connected to be responsive to angular displacement of said second shaft means.

3. Means for indicating the rate of flow of fluid in a pipe comprising an elongated frame member, first shaft means having one end pivoted in one end of said frame member, second shaft means extending longitudinally through said frame member, bevel gear means connected to said first and second shaft means for translating pivotal movement of said first shaft means to rotational movement of said second shaft means, spring means resiliently holding said first shaft means at a predetermined angular position with respect to said frame member, indicating means on the other end of said frame member responsive to angular displacement of said second shaft means, said pipe having an aperture in the wall thereof, pipe extension means surrounding said aperture and extending outwardly from said pipe and normal thereto, said indicating means being sealed to the outer end of said pipe extension means so that said frame member and second shaft means extend through said extension means and said first shaft means extends into said pipe and the pivotal axis of said first shaft means is parallel to the axis of said pipe, and airfoil section means on the other end of said first shaft means within said pipe, the axis of said airfoil section being normal to the axis of said pipe.

4. The indicating means of claim 3 in which the chord of said airfoil section has an angle of less than the critical stall angle with respect to fluid flow in said pipe parallel to the axis of said pipe.

5. The indicating means of claim 4 in which said spring means comprises a helical spring encircling said second shaft means, one end of said spring being held to said second shaft means and the other end being held to said frame member.

References Cited in the file of this patent
UNITED STATES PATENTS

| | | |
|---|---|---|
| 1,450,278 | Cave | Apr. 3, 1923 |
| 2,024,571 | Gent | Dec. 17, 1935 |

FOREIGN PATENTS

| | | |
|---|---|---|
| 612,019 | France | July 20, 1926 |
| 451,295 | Great Britain | Aug. 4, 1936 |
| 687,354 | Germany | Jan. 29, 1940 |